Feb. 28, 1961 A. I. MLAVSKY 2,973,290
PRODUCTION OF SEMI-CONDUCTOR BODIES BY IMPURITY DIFFUSION THROUGH STATIONARY INTERFACE
Filed July 2, 1957
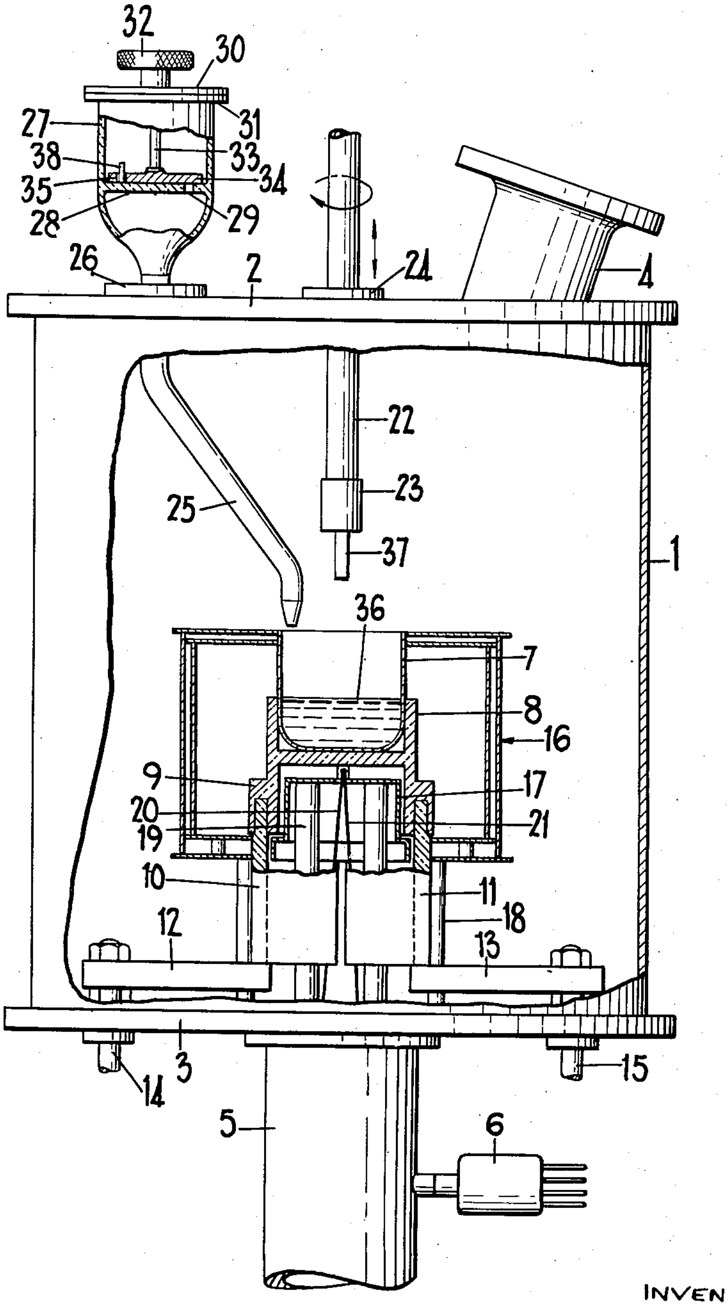
INVENTOR
ABRAHAM ISAAC MLAVSKY
BY Kirschstein, Kirschstein & Ottinger
ATTORNEYS 2,973,290
Patented Feb. 28, 1961

2,973,290

PRODUCTION OF SEMI-CONDUCTOR BODIES BY IMPURITY DIFFUSION THROUGH STATIONARY INTERFACE

Abraham Isaac Mlavsky, Wakefield, Mass., assignor to The General Electric Company Limited, Kingsway, London, England Filed July 2, 1957, Ser. No. 669,482

Claims priority, application Great Britain July 5, 1956

5 Claims. (Cl. 148—1.5)

This invention relates to the production of semiconductor bodies.

It is often required to produce a semiconductor body containing at least one transition region in which the electrical characteristics of the semiconductor vary; one common example of such a transition region is a P–N junction. It is known that such a transition region may be produced by means of diffusion in the solid semiconductor of a suitable significant impurity (that is to say an impurity whose presence in the solid semiconductor modifies the electrical characteristics of the semiconductor).

The present invention provides a method which utilises the principle of diffusion of a significant impurity in a convenient manner to produce a semiconductor body containing at least one transition region of the kind referred to above.

According to the invention, a method of producing a semiconductor body includes the successive steps of establishing a system comprising a solid body of a semiconductor in contact with a molten mass of the semiconductor, the molten mass containing a significant impurity at a concentration which is appreciably greater than $1/K$ times the concentration of said impurity in at least part of the region of the solid body which is in contact with the molten mass, where K is the partition coefficient of the impurity between the solid and liquid phases of the semiconductor, maintaining the system with the interface between the solid body and the molten mass stationary for a time sufficient for appreciable diffusion of said impurity to occur from the molten mass into the solid body, and solidifying at least part of the molten mass so that the solidified material and the original solid body form an integral resultant solid body.

It will be appreciated that the condition laid down concerning the concentrations of the impurity in the molten mass and the solid body is necessary in order to ensure that appreciable diffusion of the impurity from the molten mass into the solid body is possible.

It is to be understood that the total impurity content of the semiconductor in both the molten mass and the solid body must not be such as to give rise to any significant alteration in the melting point of the semiconductor.

A method in accordance with the invention has the following advantageous features. Firstly, the transition region produced by the diffusion may be situated at virtually any desired position in the resultant semiconductor body, and furthermore a series of transition regions may be produced by diffusion at different positions in a single final semiconductor body; secondly, since the region of the solid body which is in contact with the molten mass during the diffusion will be at a temperature just below the melting point of the semiconductor, the diffusion will proceed relatively rapidly; thirdly, the steps of the method recited above may be conveniently combined with other operations which it may be desired to carry out during production of the semiconductor body.

In many applications of methods in accordance with the invention, it may be desired to alter the significant impurity content of the molten mass before and/or during the solidification so as to affect the electrical characteristics of the subsequently solidified semiconductor. According to one aspect of the invention, such a result may be achieved by maintaining the molten mass, before and/or during the solidification, under such conditions as to bring about evaporation of said significant impurity from the molten semiconductor. Such a method of altering the impurity content of the molten mass is particularly advantageous in cases where it is desired to produce a series of substantially identical transition regions in a single final semiconductor body. The impurity content of the molten mass may also, of course, be altered by addition of a significant impurity to the molten mass in known manner.

The solid-liquid semiconductor system may be conveniently established by solidifying part of an initial melt of the semiconductor; for example, the solid-liquid system may be established during the growth of a single crystal of the semiconductor from the melt. Alternatively, the solid-liquid system may be established by melting part of an initial semiconductor body; or may be established by bringing into contact a solid body and a molten mass of the semiconductor derived from separate sources.

One method in accordance with the invention will now be described by way of example with reference to the accompanying drawing, which is a side elevation, partly cut away to show internal details which are partly shown in section, of an apparatus for preparing single crystals of silicon.

Referring to the drawing, the apparatus includes a hermetically sealed enclosure constituted by a tubular metal member 1 to the ends of which are sealed top and base metal plates 2 and 3 respectively, the top plate 2 having sealed to it an inspection port 4 across the outer end of which is sealed a quartz window (not visible in the drawing) through which operations carried out in the enclosure can be observed. The enclosure communicates with one end of a tube 5 to which is connected an ionisation gauge 6; the other end of the tube 5 may be connected by suitable taps (not shown) either to a pumping system (not shown) or to a source of argon (not shown).

Inside the enclosure is disposed a circular cylindrical crucible 7 of pure fused silica, the crucible 7 being seated within a circular cylindrical graphite cup 8 which is adapted to serve as an electric resistance heater. The cup 8 is formed integral with a downwardly extending circular cylindrical graphite skirt 9 which is split longitudinally so as to form two semi-cylindrical portions each of which has formed in it a slot into which fits one end of one of a pair of semi-cylindrical graphite members 10 and 11 which serve as supports and parts of the lead system for the heater 8; the members 10 and 11 are themselves mounted on metal bars 12 and 13, which are in turn secured to metal bolts 14 and 15 which are sealed through the base plate 3 so as to be electrically insulated therefrom. The crucible 7 and heater 8 are surrounded by a heat reflecting metal baffle system 16, and a further heat reflecting baffle 17 is disposed inside the skirt 9; the baffle system 16 and baffle 17 are supported by means of quartz rods such as 18 and 19 which are themselves mounted on a metal spider (not visible in the drawing) which extends across the opening of the tube 5. In operation of the apparatus, the temperature of the heater 8 is measured by means of a noble metal thermocouple including elements 20 and 21, the hot junction of the thermocouple being disposed close to the base of the heater 8 and the cold junction of the thermocouple (not shown) being maintained in melting ice. Besides being utilised to operate an indicating instrument (not shown) the voltage generated by the thermocouple is fed to a control unit (not shown) which is adapted to maintain the temperature of the heater 8 substantially constant at any desired setting by automatic control of the power supply to the heater 8.

The apparatus also includes a holder for a silicon seed crystal which is in the form of a vertically extending rod 22 to the lower end of which is secured a chuck 23, the rod 22 passing through a gland 24 in the top plate 2 and being both vertically movable and rotatable about its longitudinal axis by means of a suitable mechanism (not shown). The apparatus further includes a bent quartz tube 25 which passes through a gland 26 in the top plate 22 and has its lower end in register with the crucible 7. The upper end of the tube 25 is sealed to a quartz dome 27 which has formed across it a partition 28 in which is formed an aperture 29; the upper end of the dome 27 is closed by a ground quartz plate 30 which mates with a ground quartz flange 31 formed on the end of the dome 27, the mating surfaces of the plate 30 and flange 31 being greased to maintain an effective seal between them. The plate 30 is provided with a knob 32 by means of which it can be rotated on the flange 31, and is connected by a rod 33 to a plate 34 which rests on the partition 28 and has formed in it a series of apertures such as 35 spaced around a circle whose centre lies on the axis of the rod 33.

In carrying out the method in accordance with the invention a quantity of about 100 grams of solid silicon containing about 0.06 part per million (by atomic proportions) of boron is placed in the crucible 7, the enclosure is evacuated by connecting the tube 5 to the pumping system and operating the pumping system so as to establish in the enclosure a vacuum corresponding to a pressure of the order of $10^{-4}$ millimetres of mercury as measured by the gauge 6, and the crucible 7 and its contents are then heated to a temperature 30° C. above the melting point of silicon by energising the heater 8 so as to form a pool 36 of molten silicon. The molten silicon 36 is maintained at this elevated temperature for about one hour, during which time a large part of the impurities originally present, but not including the boron, evaporate from the molten silicon 36, the enclosure being continuously pumped.

At the end of this time a silicon seed crystal 37 mounted in the chuck 23 and having a horizontal cross-sectional area of 25 square millimetres is dipped into the molten silicon 36 by moving the rod 22 downwards, and the temperature of the molten silicon 36 is lowered to the point at which it begins to solidify on to the seed crystal 37. The rod 22 is then moved vertically upwards at a rate of one millimetre per minute so that silicon from the melt 36 progressively solidifies so as to form a single crystal (not shown) propagated from the seed crystal 37, this single crystal being in the form of a vertically extending rod having a cross-sectional area of about five square centimetres. In order to ensure homogenous mixing, the rod 22 is rotated about a vertical axis at a speed of three revolutions per minute, while it is being moved upwards.

The silicon which solidifies initially is of P-type conductivity and has a resistivity at room temperature of about five ohm centimetres. After about 10 grams of this material has been solidified, growth of the single crystal is halted, the tube 5 is disconnected from the pumping system and connected to the source of argon, and argon is admitted into the enclosure until the pressure in the enclosure corresponds approximately to normal atmospheric pressure. A pellet 38 consisting of about 10 milligrams of antimony, which has previously been disposed in the aperture 35 in the plate 34, is then caused to drop through the tube 25 into the molten silicon 36 by rotating the plates 30 and 34 by means of the knob 32 so that the aperture 35 in the plate 34 comes into register with the aperture 29 in the partition 28. The conditions in the enclosure are then maintained substantially constant for a period of about 30 minutes; during this period antimony diffuses from the molten silicon 36 into the part of the solidified silicon which is in contact with the molten silicon 36, the result of the diffusion being to establish a significant concentration of antimony in a layer about 0.005 millimetre thick in the solid silicon immediately adjacent the interface between the solid and molten silicon. The concentration of antimony decreases across the thickness of this layer away from the interface between the solid and molten silicon, the concentration of antimony being such that the major part of the layer is of N-type conductivity, and the maximum value of the concentration corresponding to a room temperature resistivity of the order of 0.1 ohm centimetre.

At the end of the period of 30 minutes referred to above, the pumping system is reconnected to the tube 5, and the enclosure is re-evacuated to the same degree as initially. Growth of the single crystal, in the same manner as before, is then restarted after a further period of 5–10 minutes, during which practically all the antimony remaining in the molten silicon 36 will evaporate from the molten silicon 36, so that when growth is restarted the silicon solidifying from the melt 36 is again of P-type conductivity with a resistivity of about five ohm centimetres. It will be appreciated that during subsequent growth of the single crystal, the exact nature of the P–N–P transition produced by the operations described above will be somewhat altered by redistribution of the antimony introduced into the solidified silicon; the effect of this redistribution of antimony will, however, be relatively slight, particularly if a steep temperature gradient is established along the length of the growing single crystal.

The operations described above for producing a P–N–P transition are repeated several times during the growth of the single crystal, so that the resultant single crystal contains several such P–N–P transitions; in order to obtain substantially identical transitions the amount of the antimony which is added is progressively reduced on each occasion, according to the amount of silicon remaining molten, so that the concentration of antimony in the molten silicon 36 has substantially the same value immediately after each addition of antimony. The process is terminated then substantially all the molten silicon 36 has been withdrawn from the crucible 7.

It will be appreciated that a single crystal prepared by the method described above may be divided so as to provide a large number of small semiconductor bodies each containing two P-type regions separated by a thin N-type layer, and therefore suitable for the production of P–N–P junction transistors.

In a modification of the method described above, after each diffusion operation and the subsequent evaporation of the antimony from the molten silicon, indium is added to the molten silicon immediately before restarting growth of the single crystal. During the subsequent growth of the single crystal in vacuo, some of the indium will be incorporated in the solidifying silicon and some will evaporate from the molten silicon, and the growth of the single crystal is halted for the purpose of forming the next N-type layer only after the molten silicon has become substantially free of the added indium. By this means there is produced a single crystal containing a series of P–N–P transitions for each of which the resistivity of the P-type silicon is greater adjacent one side of the N-type layer than adjacent the other side of this layer. In order to make the transitions substantially identical, the amount of indium which is added should of course be progressively reduced on each occasion in the same manner as is indicated above in connection with the additions of antimony.

Alternative impurities which can be used in place of antimony in the method described above are arsenic and phosphorus; antimony is normally preferred however, because its evaporation rate from molten silicon is higher than those of arsenic and phosphorus. If it were desired to produce a silicon single crystal containing a series of N–P–N transitions, a method similar to that described above could be used, phosphorus being employed in place of boron and indium or gallium in place of antimony; in this case some modifications in the method would probably be necessary to take account of the fact that phosphorus itself evaporates, though relatively slowly, from molten silicon in vacuo. Thus the phosphorus in the initial melt might be introduced after the purification process instead of being included in the solid silicon from which the melt is produced, and the N-type regions of the single crystal might be grown under an atmosphere of inert gas instead of in vacuo; further, after each diffusion operation and the subsequent evaporation of the indium or gallium from the molten silicon, it might be desirable to add further phosphorus to the molten silicon before the next diffusion operation, so as to counterbalance the effect of evaporation of the phosphorus from the molten silicon occurring at the same time as the evaporation of the indium or gallium.

I claim:

1. A method of producing a semiconductor body including the steps of establishing a system comprising a solid body of a semiconductor in contact with a molten mass of the semiconductor, the molten mass containing a significant impurity at a concentration which is appreciably greater than $1/K$ times the concentration of said impurity in at least part of the region of the solid body which is in contact with the molten mass, where K is the partition coefficient of the impurity between the solid and liquid phases of the semiconductor, maintaining the temperature and pressure conditions in the system at the interface between the solid body and the molten mass constant so as to maintain said interface stationary for a time sufficient for appreciable diffusion of said impurity to occur from the molten mass into the solid body, subsequently solidifying at least part of the molten mass so that the solidified material and the original solid body form an integral resultant solid body, and evaporating said impurity substantially completely from the molten mass after the diffusion and before the completion of the solidification.

2. A method according to claim 1, in which the diffusion of said impurity is such as to reverse the conductivity type of part of the original solid body.

3. A method according to claim 1, in which all the recited steps are repeated at least once, the original solid body in respect of each repetition of said steps being constituted by the resultant solid body produced by the preceding occurrence of the steps.

4. A method according to claim 1 in which a molten mass of a semiconductor is progressively solidified and in which the following operations are carried out repeatedly in the order stated: solidifying part of the molten semiconductor at a time when its significant impurity content is such that the solidifying semiconductor is of one conductivity type, halting the solidification, adding to the molten semiconductor a significant impurity which corresponds to the conductivity type opposite to said one conductivity type and which is not present in appreciable concentration in the region of the solidified semiconductor which is in contact with the molten semiconductor, maintaining the temperature and pressure conditions at the interface between the solidified semiconductor and the molten semiconductor constant so as to maintain said interface stationary while diffusion of said impurity takes place from the molten semiconductor into the solidified semiconductor to an extent sufficient to convert a thin layer of the solidified semiconductor which is in contact with the molten semiconductor to said opposite conductivity type, and after the diffusion of the impurity and before the completion of the following solidification maintaining the molten semiconductor under such conditions and for such a time that substantially all the remainder of said impurity in the molten semiconductor evaporates from the molten semiconductor.

5. A method according to claim 4, in which after each evaporation operation there is added to the molten semiconductor a second significant impurity, which corresponds to said one conductivity type, and on each occasion the solidification of part of the molten semiconductor is carried out under conditions such that said second impurity evaporates from the molten semiconductor, the solidification being halted only after the molten semiconductor has become substantially free of said second impurity.

References Cited in the file of this patent

UNITED STATES PATENTS

| | | |
|---|---|---|
| 2,730,470 | Shockley | Jan. 10, 1956 |
| 2,762,730 | Alexander | Sept. 11, 1956 |
| 2,798,989 | Welker | July 9, 1957 |
| 2,815,303 | Smith | Dec. 3, 1957 |
| 2,822,308 | Hall | Feb. 4, 1958 |
| 2,879,189 | Shockley | Mar. 24, 1959 |
| 2,892,739 | Rushler | June 30, 1959 |
| 2,894,863 | Bradshaw | July 14, 1959 |
| 2,899,343 | Statz | Aug. 11, 1959 |

FOREIGN PATENTS

| | | |
|---|---|---|
| 751,408 | Great Britain | June 27, 1956 |
| 1,113,385 | France | Mar. 28, 1956 |